(12) United States Patent
Zhan et al.

(10) Patent No.: US 12,177,551 B2
(45) Date of Patent: Dec. 24, 2024

(54) SYSTEMS AND METHODS FOR HIGH QUALITY IMAGING USING A COLOR-SPLITTING META-OPTICAL COMPUTATION CAMERA

(71) Applicant: Tunoptix, Inc., Seattle, WA (US)

(72) Inventors: Alan Zhan, Seattle, WA (US); Shane Alexander Colburn, Seattle, WA (US); John Joseph Fijol, Shrewsbury, MA (US)

(73) Assignee: Tunoptix, Inc., Seattle, WA (US)

( * ) Notice: Subject to any disclaimer, the term of this patent is extended or adjusted under 35 U.S.C. 154(b) by 0 days.

(21) Appl. No.: 18/168,632

(22) Filed: Feb. 14, 2023

(65) Prior Publication Data

US 2023/0262307 A1 Aug. 17, 2023

Related U.S. Application Data (60) Provisional application No. 63/309,911, filed on Feb. 14, 2022.

(51) Int. Cl.
*H04N 23/55* (2023.01)
*G02B 5/20* (2006.01)
(Continued)

(52) U.S. Cl.
CPC ............. *H04N 23/55* (2023.01); *G02B 5/208* (2013.01); *G02B 7/02* (2013.01); *G06T 5/50* (2013.01);
(Continued)

(58) Field of Classification Search
None
See application file for complete search history.

(56) References Cited

U.S. PATENT DOCUMENTS 10,403,668 B2 * 9/2019 Arbabi .............. H01L 27/14605
10,979,635 B2 4/2021 Hu et al.
(Continued)

FOREIGN PATENT DOCUMENTS

CN 111862321 A * 10/2020 ............. G06K 9/629
CN 113099078 A * 7/2021 ........... H04N 5/2251
(Continued)

OTHER PUBLICATIONS

English translation of WO-2021036721-A1, Zhang, Mar. 2021 (Year: 2021).*

(Continued)

*Primary Examiner* — James M Hannett
(74) *Attorney, Agent, or Firm* — Cooley LLP (57) ABSTRACT

In an embodiment, a system comprises a first camera including a first filter having a spectral response, a first meta-optic lens, and a first sensor. The system comprises a second camera including a second filter having a spectral response different than the spectral response of the first filter, a second meta-optic lens, and a second sensor. The system also comprises a processor configured to receive a representation of a first image of a scene captured by the first camera, receive a representation of a second image of the scene captured by the second camera, and generate a representation of a superposed image of the scene based on the representation of the first image and the representation of the second image, the representation of the superposed image having an aberration lesser than an aberration of the representation of the first image and an aberration of the representation of the second image.

20 Claims, 3 Drawing Sheets

(51) Int. Cl.
  *G02B 7/02* (2021.01)
  *G06T 5/50* (2006.01)
  *G06T 5/80* (2024.01)
(52) U.S. Cl.
  CPC ...... *G06T 5/80* (2024.01); *G06T 2207/10024* (2013.01); *G06T 2207/20221* (2013.01)

(56) References Cited

U.S. PATENT DOCUMENTS

| | | | |
|---|---|---|---|
| 11,184,546 B2 | 11/2021 | Cho et al. | |
| 11,610,925 B2* | 3/2023 | Fu | G02B 1/002 |
| 2006/0054782 A1* | 3/2006 | Olsen | G02B 13/0035 |
| | | | 348/E5.037 |
| 2020/0388642 A1* | 12/2020 | Fu | G06T 5/50 |
| 2021/0028215 A1 | 1/2021 | Devlin et al. | |
| 2021/0360154 A1 | 11/2021 | Slobodin | |
| 2022/0052093 A1 | 2/2022 | Devlin et al. | |
| 2022/0239883 A1* | 7/2022 | Wong | H04N 13/111 |

FOREIGN PATENT DOCUMENTS

| | | | | |
|---|---|---|---|---|
| KR | 20210006842 A | | 1/2021 | |
| TW | 202024723 A | * | 7/2020 | ............. G02B 1/002 |
| WO | WO-2021036721 A1 | * | 3/2021 | ........... H04M 1/0264 |

OTHER PUBLICATIONS

English translation of TW-202024723-A, Chen, Jul. 2020 (Year: 2020).*
English translation of CN-113099078-A, Luo, Jul. 2021 (Year: 2021).*
English translation of CN-111862321-A, Zhao, 20/2020 (Year: 2020).*
Kronander, et al. "A Unified Framework for Multi-Sensor HDR Video Reconstruction" Signal Processing: Image Communication, Mar. 1, 2013, 29(2):1-14.
Malvar et al. "High-quality linear interpolation for demosaicing of Bayer-patterned color images," 2004 IEEE International Conference on Acoustics, Speech, and Signal Processing, Jun. 2004, 5 pages.
Mustaniemi, et al. "Disparity Estimation for Image Fusion in a Multi-aperture Camera," Azzopardi G., Petkov N. (eds) Computer Analysis of Images and Patterns, CAIP 2015, Part II, Lecture Notes in Computer Science, 2015, 9257:158-170.
Tseng, et al. "Neural nano-optics for high-quality thin lens imaging," Nature Communications, Nov. 29, 2021, 12(6493):1-7.
International Search Report and Written Opinion for International Application No. PCT/US2023/062549 dated May 2, 2023, 10 pages.

* cited by examiner

Receive a representation of a plurality of images of a scene captured by a plurality of cameras, each camera from the plurality of cameras including a filter, a meta-optic lens, and a sensor, for each camera from the plurality of cameras, a spectral response of the filter for that camera differing from a spectral response of the filter for each remaining camera from that plurality of cameras
302

Generate a representation of a superposed corrected image of the scene based on the representation of the plurality of images
304

Fig. 3

SYSTEMS AND METHODS FOR HIGH QUALITY IMAGING USING A COLOR-SPLITTING META-OPTICAL COMPUTATION CAMERA

CROSS-REFERENCE TO RELATED APPLICATION

This application claims the benefit of U.S. Provisional Patent Application No. 63/309,911, filed Feb. 14, 2022, entitled "SYSTEMS AND METHODS FOR HIGH QUALITY IMAGING USING A COLOR-SPLITTING META-OPTICAL COMPUTATION CAMERA", which is herein incorporated by reference in its entirety.

FIELD

In one or more embodiments, a meta-optical computation camera can perform color splitting to generate at least one high-quality image.

BACKGROUND

In an effort to produce smaller cameras (e.g., for ultra-thin phones or laptops), the performance of such cameras can be sacrificed. Meta-optics can be one potential solution to miniaturizing optics because the lens is flat (rather than being curved). Meta-optics, however, cannot always correct all aberrations optically (e.g., for highly constrained systems). Thus, a need exists for an improved smaller camera.

SUMMARY

In one or more embodiments, a system comprises a first camera including a first filter having a spectral response, a first meta-optic lens, and a first sensor. The system also comprises a second camera including a second filter having a spectral response different than the spectral response of the first filter, a second meta-optic lens, and a second sensor. The system also comprises a processor configured to receive a representation of a first aberrated image of a scene captured by the first camera, receive a representation of a second aberrated image of the scene captured by the second camera, and generate a representation of a superposed image of the scene based on the representation of the first image and the representation of the second image.

In one or more embodiments, a system comprises a plurality of cameras configured to generate a representation of a plurality of images of a scene, each camera from the plurality of cameras including a filter with a spectral response different from a spectral response of a filter for each remaining camera, a meta-optic lens, and a sensor. The system also comprises a processor configured to receive the representation of the plurality of images of the scene, and generate a representation of a superposed image of the scene based on the representation of the plurality of images.

In one or more embodiments, a method comprises receiving a representation of a plurality of images of a scene captured by a plurality of cameras, each camera from the plurality of cameras including a filter, a meta-optic lens, and a sensor. For each camera from the plurality of cameras, a spectral response of the filter for that camera is different from a spectral response of the filter for each remaining camera from the plurality of cameras. A representation of a superposed corrected image of the scene is generated based on the representation of the plurality of images.

DETAILED DESCRIPTION

The techniques discussed herein relate to using a plurality of meta-optic lenses, as well as circuitry and/or software, to reduce camera system size (e.g., reduce track length of optics) while also maintaining and/or enhancing imaging performance. Said similarly, the techniques discussed herein use meta-optics, which can reduce camera system size, but don't rely on the meta-optics to directly correct all aberrations optically. Rather, meta-optics can operate alongside circuitry and/or software to produce high-quality (e.g., non-aberrated) images.

A plurality of meta-optics can be used, where each meta-optic is tailored to subranges (e.g., colors) of the full spectral range. Each meta-optic lens can, for example, impart a high-quality blur kernel that is nearly invariant over the field of view for its respective color channel (i.e., spectral subrange). Thus, with each meta-optic lens dedicated to a narrow and separate spectral window, the constraints placed on each meta-optic can be mitigated.

Figure 1:
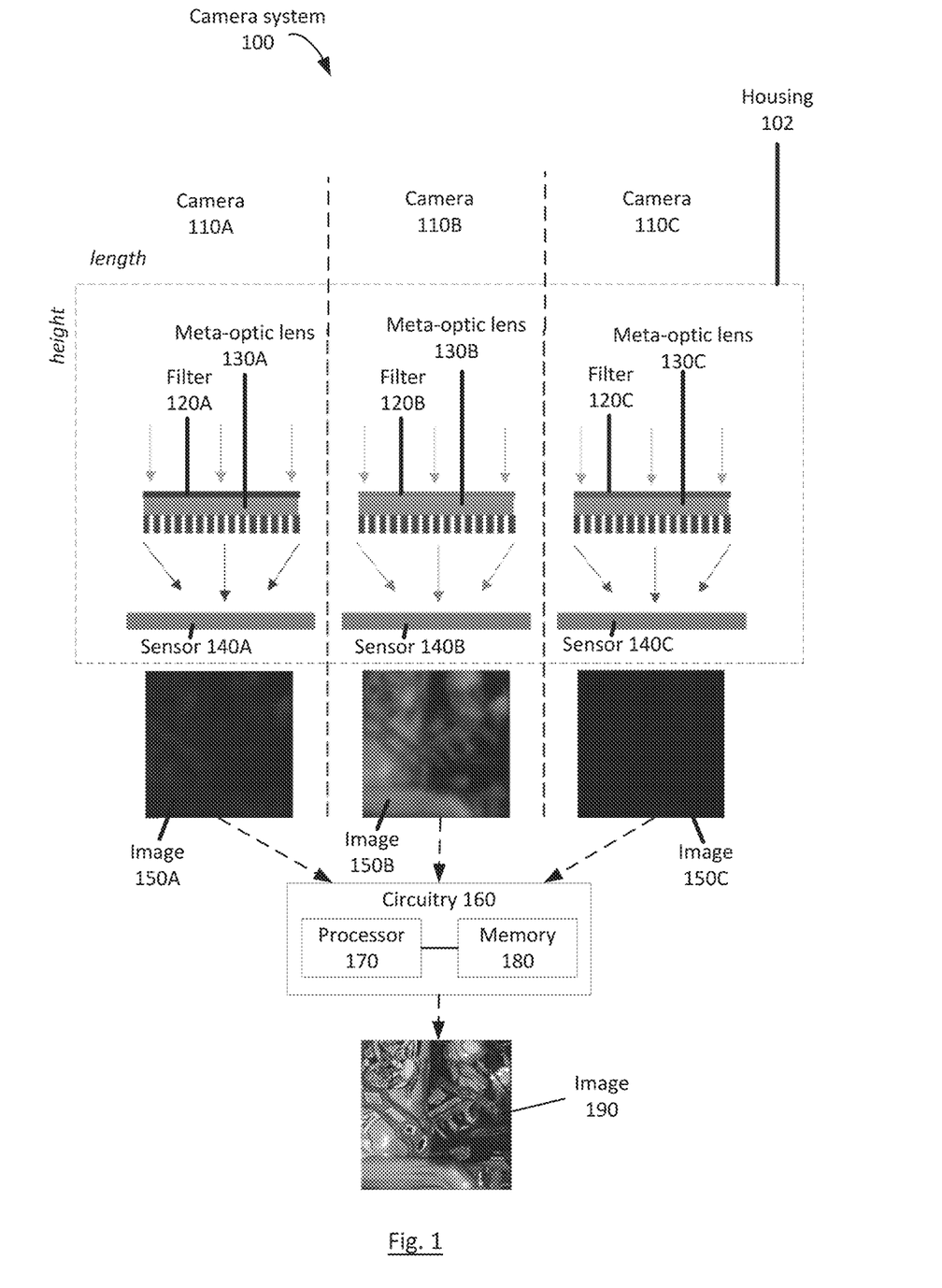
FIG. 1 shows a system for generating a non-aberrated image based on a representation(s) of multiple aberrated images each captured using an individual meta-optic lens, according to an embodiment.

FIG. 1 shows a diagram of a camera system 100 that can generate an image 190 (e.g., formed image or representation of an image) based on representations of images 150A, 150B, 150C captured by cameras 110A, 110B, 110C, according to an embodiment. In some implementations, placing cameras 110A, 110B, 110C adjacent to one another (e.g., in a side-by-side arrangement, as shown in FIG. 1) can decrease a thickness and/or track length of camera system 100. In some implementations, the total track length of the camera system 100 is, for example, less than 1 millimeter. In some implementations, the cameras 110A, 110B, 110C can be slightly diagonal to one another (e.g., in a triangular formation). In some implementations, camera system 100 can be and/or be included in a camera, webcam, laptop, tablet, phone, television, smart-glasses, smart-watch, vehicle, or any other image capturing device (not shown). Each camera 110A, 110B, 110C can include a single meta-optic lens 130A, 130B, 130C.

The filters 120A, 120B, 120C, meta-optic lenses 130A, 130B, 130C, and sensors 140A, 140B, 140C can be included in a housing 102. In some implementations, the circuitry 160 is included in the housing 102. In some implementations, the circuitry 160 is not included in the housing 102, in which case electronic representations of the images 150A, 150B, 150C generated by sensors 140A, 140B, 140C in the housing 102 can be sent to the circuitry 160 over, for example, a trace(s) connecting sensor 104A to processor 170 and/or memory 180, a trace(s) connecting sensor 140B to processor 170 and/or memory 180, and a trace(s) connecting sensor 140C to processor 170 and/or memory 180. Furthermore, incident light can pass through a hole(s) of the housing 102 and contact the filters 120A, 120B, 120C.

In some implementations, housing 102 has a length that is less than approximately (e.g., within 10% of) at least one of:

6 mm, 5 mm, 4.5 mm, 4 mm, 3.5 mm, or 3 mm. In some implementations, housing 102 has a width that is less than approximately (e.g., within 10% of) at least one of: 2 mm, 1.5 mm, 1.4 mm, 1.3 mm, 1.2 mm, 1.1 mm, 1 mm, 0.9 mm, 0.8 mm, 0.7 mm, 0.6 mm, or 0.5 mm. In some implementations, housing 102 has a height that is less than approximately (e.g., within 10% of) at least one of: 1.5 mm, 1.1 mm, 1 mm. 0.9 mm, 0.8 mm, 0.7 mm. 0.6 mm. or 0.5 mm. In some implementations, the dimensions (length×width×height) of the housing 102 is approximately (e.g., within 10% of) 1 mm×5 mm×1.4 mm.

Within the housing 102, the filters 120A, 120B, 120C can each have a substantially similar size relative to one another, have a substantially different size relative to one another (e.g., based on differing predetermined sampling rates), or a combination thereof (e.g., similar size to one filter but different size to relative to another filer). Within the housing 102, the meta-optic lenses 130A, 130B, 130C can each have a substantially similar size relative to one another, have a substantially different size relative to one another (e.g., based on differing predetermined sampling rates), or a combination thereof (e.g., similar size to one filter but different size to relative to another filer). Within the housing 102, the sensors 140A, 140B, 140C can each have a substantially similar overall size, pixel count, and/or pixel size relative to one another, have a substantially different overall size, pixel count, and/or pixel size relative to one another (e.g., based on differing predetermined sampling rates), or a combination thereof (e.g., similar overall size, pixel count, and/or pixel size to one filter but different overall size, pixel count, and/or pixel size to relative to another filer).

Note that FIG. 1 shows images 150A, 150B, 150C as formed images. It can be appreciated, however, that images 150A, 150B, 150C are electronic representations (e.g., not in a human-viewable form) provided by the sensors 140A, 140B, 140C respectively to the circuitry 160, and do not ever need to be transformed into formed images and/or can be transformed into formed images (e.g., in a human-viewable form) at the circuitry 160. The images 150A, 150B, 150C are shown for the sake of providing a sense of what the representations captured by the sensors 140A, 140B, 140C can look like in some implementations. Furthermore, the image 190 can be generated by the circuitry 160 as a representation of the image 190 and/or a formed version of the image 190.

The first camera 110A includes a filter 120A, meta-optic lens 130A, and sensor 140A (also referred to as a "detector"). Light (e.g., white light) from a scene (e.g., a human and their background) can travel through the filter 120A, travel through the meta-optic lens 130A, and be incident on the sensor 140A to generate a representation of (e.g., an electronic signal representing) image 150A.

In some implementations, the filter 120A can be a color filter. The filter 120A can be of any color, such as red, blue, yellow, green, cyan, magenta, or a combination thereof. In some implementations, the filter 120A can be one of red, green, or blue. In some implementations, the filter 120A can be one of red, green, blue, or yellow. Using a color filter can allow the meta-optic lens 130A to contend with a wavelength range that is narrower than the full visible spectrum, which in turn can allow the meta-optic lens 130A to more easily provide a field of vision (FoV)-invariant blur kernel.

In some implementations, the meta-optic lens 130A is substantially flat, transparent at visible and infrared wavelengths (i.e., the meta-optic lens 130A has a substantially uniform spectral response at visible and infrared wavelengths), and/or compatible with single-stage lithography processes. The meta-optic lens 130A can include, for example, a patterned dielectric layer having a range of different widths; in some implementations, the dielectric can be gallium nitride, silicon nitride, and/or titanium dioxide. A shape of the meta-optic lens 130A is not substantially convex nor substantially concave. The term "substantially" is used to account for variability (e.g., manufacturing variability, environmental variability, etc.) that may occur.

In some implementations, the sensor 140A can convert an optical image into an electronic signal representing an image (e.g., image 150A). In some implementations, the sensor 140A is an image sensor (e.g., charge-coupled device, active-pixel sensor, etc.). After light has travelled through the filter 120A and meta-optic lens 130A, the light can contact the sensor 140A. Thereafter, the sensor 140A generate a representation of the image 150A. In some implementations, the sensor 140A is not a Bayer-filtered sensor.

In some implementations, if the filter 120A is a color filter, the representation of the image 150A (e.g., if transformed into a formed image) has the same hue as the filter 120A. For example, if the filter 120A was red, the image 150A also has a red hue. As another example, if the filter 120A was green, the image 150A also has a green hue. As another example, if the filter 120A was blue, the image 150A also has a blue hue. Furthermore, the representation of image 150A (e.g., if transformed into a formed image) can include at least one aberration. In some implementations, the representation of the image 150A is blurry (e.g., if transformed into a formed image) (i.e., the scene captured by the first camera 110A is not clearly or distinctly visible in the image 150A).

The second camera 110B and third camera 110C can each be similar and/or identical to the camera 110A, with at least one difference being that the filter 120A of the first camera 110A, the filter 120B of the second camera 110B, the filter 120C of the third camera 110C each differs from the others. For example, each filter 120A, 120B and 120C can have a spectral subrange mutually exclusive from the spectral subrange of the other filters 120A, 120B and 120C. For another example, each filter 120A, 120B and 120C can have a spectral subrange different from, but possibly partially overlapping with, the spectral subrange of the other filters 120A, 120B and 120C. In some implementations, filters 120A, 120B, 120C are each associated with a different color. For example, filter 120A can be a red color filter, filter 120B can be a green color filter, and filter 120C can be a blue color filter.

Otherwise, as was the case for the first camera 110A, light from the same scene can travel through filters 120B and 120C, travel through meta-optic lenses 130B and 130C, and be incident on sensors 140B and 140C to generate representations of images 150B and 150C, respectively. As was the case for image 150A, where the filters 120B, 120C are color filters, the respective representations of images 150B, 150C (e.g., if transformed into formed images) can have the same hue as their associated filter 120B, 120C. The representations of the images 150B, 150C (e.g., if transformed into formed images) can also each include and/or be associated with at least one aberration, where, for example, the at least one aberration for each representation of image 150A, 150B, and 150C can be of the same type (e.g., blurry, noisy, etc.), but to differing degrees (e.g., due to spectral response differences). In some implementations, the representations of images 150B, 150C (e.g., if transformed into formed images) are blurry (i.e., the scene captured by the second camera 110B and/or third camera 110C is not clearly or distinctly visible in the images 150B, 150C).

The representations of images 150A, 150B, 150C can be sent to and received by circuitry 160, which includes a processor 170 and memory 180 operatively coupled to the processor 170 (e.g., via a system bus). Optionally, the circuitry 160 can be used to transform the representations of images 150A, 150B, 150C into formed images. The circuitry 160 can be used to generate the image 190 (e.g., as a formed image and/or as an electronic representation), which is less aberrated than images 150A, 150B, 150C and/or substantially non-aberrated (e.g., not blurry or not as blurry).

The processor 170 can be, for example, a hardware based integrated circuit (IC) or any other suitable processing device configured to run and/or execute a set of instructions or code. For example, the processor 170 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 170 can be configured to run any of the methods and/or portions of methods discussed herein.

The memory 180 can be, for example, a random-access memory (RAM), a memory buffer, a hard drive, a read-only memory (ROM), an erasable programmable read-only memory (EPROM), and/or the like. The memory 180 can be configured to store any data used by the processor 170 to perform the techniques discussed herein. In some instances, the memory 180 can store, for example, one or more software programs and/or code that can include instructions to cause the processor 170 to perform one or more processes, functions, and/or the like. In some implementations, the memory 180 can include extendible storage units that can be added and used incrementally. In some implementations, the memory 180 can be a portable memory (for example, a flash drive, a portable hard disk, and/or the like) that can be operatively coupled to the processor 170. In some instances, the memory 180 can be remotely operatively coupled with a compute device (not shown in FIG. 1).

Although not shown in FIG. 1, the memory 180 can store a software model(s). The processor 170 can use the software model(s) to transform representations of the images 150A, 150B, 150C generated by the sensors 140A, 140B, 140C into formed images 150A, 150B, 150C. In some implementations, the software model(s) performs parallax correction, deconvolution, distortion correction, and/or up-sampling on each of the images 150A, 150B, 150C (or transformations generated based on the images 150A, 150B, 150C) such that the images 150A, 150B, 150C are less aberrated and/or no longer aberrated (e.g., less or no blur). In some implementations, the representations of the images 150A, 150B, 150C are first separately deconvolved to generate representations of deconvolved images. Additional details related to deconvolving the representations of images (such as images 150A, 150B, 150C) to generate the representations of deconvolved images can be found in "Neural nano-optics for high-quality thin lens imaging" (Tseng, E. Colburn, S., Whitehead, J. et al. Neural nano-optics for high-quality thin lens imaging. *Nat Commun* 12, 6493 (2021)), the contents of which are incorporated by reference in its entirety herein. Thereafter, each of these representations of deconvolved images are aligned (i.e., parallax corrected) to a single camera in the camera system 100, as well as multiple (e.g., all) cameras in the camera system 100. Additional details related to parallax correction to a single camera can be found in "Disparity Estimation for Image Fusion in a Multi-aperture Camera" (Mustaniemi J., Kannala J., Heikkilä J. (2015) Disparity Estimation for image Fusion in a Multi-aperture Camera. In: Azzopardi G., Petkov N. (eds) Computer Analysis of Images and Patterns. CAIP 2015. Lecture Notes in Computer Science, vol 9257. Springer, Cham.), the contents of which are incorporated by reference in its entirety herein. Additional details related to parallax correction to multiple cameras can be found in "A unified framework for multi-sensor HDR video reconstruction" (Joel Kronander, Stefan Gustavson, Gerhard Bonnet, Anders Ynnerman, Jonas Unger, A unified framework for multi-sensor HDR video reconstruction, Signal Processing: Image Communication, Volume 29, Issue 2, 2014, Pages 203-215, ISSN 0923-5965, the contents of which are incorporated by reference in its entirety herein.

Thereafter, the software model(s) can superpose the representation of each of the non-aberrated versions of the images 150A, 150B, 150C over one another to generate the image 190. In some implementations, the image 190 is an RGB (i.e., (red, green, blue)) image. In some implementations, demosaicing can be performed by the software model(s) to generate the image 190 after performing the parallax correction and deconvolution discussed above. Additional details related to the demosaicing that can be performed to generate the image 190 can be found at "HIGH-QUALITY LINEAR INTERPOLATION FOR DEMOSAICING OF BAYER-PATTERNED COLOR IMAGES" (H. S. Malvar, Li-wei He and R. Cutler, "High-quality linear interpolation for demosaicing of Bayer-patterned color images," 2004 *IEEE International Conference on Acoustics, Speech, and Signal Processing*, 2004, pp. iii-485), the contents of which are incorporated by reference in its entirety herein.

In some implementations, a representation of the image 190 is stored in the memory 180. In some implementations, a representation of the image 190 is sent to a compute device (not shown in FIG. 1) communicably coupled to the camera system 100 (e.g., via a wired or wireless connection or network). In some implementations, a representation of the image 190 is transformed into a formed image and displayed via a display (not shown in FIG. 1); the image 190 can be displayed, for example, to a user associated with (e.g., using or having access to) the camera system 100.

Although the camera system 100 discussed above included three cameras 110A, 110B, 110C, in some implementations, two cameras can be used. In other implementations, four or more cameras can be used. Each of the cameras can include a meta-optic lens, sensor, and unique color filter. Each of the cameras can also be operatively coupled to circuitry (e.g., circuitry 160) configured to generate representations of aberrated images (e.g., image 150A, 150B, 150C), a representation of a substantially non-aberrated image (e.g., image 190) from the aberrated images and/or an image with less aberration (e.g., image 190) from and relative to the aberrated images.

In some implementations, where two cameras are used, the first camera can be associated with a first spectral subrange (e.g., red, orange, and yellow), and the second camera can be associated with a second spectral subrange (e.g., green, blue, indigo, and violet). In some implementations, the camera system 100 is a combined visible/near-infrared (VIS/NIR) camera with two channels (i.e., a VIS channel and a NIR channel); in such a scenario, a first channel (e.g., camera) can include a VIS filter and the second channel (e.g., camera) can include a NIR filter. In some implementations, where four cameras are used, the first camera can include a red color filter, the second camera can include a green color filter, the third camera can include a blue color filter, and the fourth camera can include a yellow camera filter.

In some implementations, two cameras can be associated with substantially (e.g., at least 95% similar, at least 99% similar, etc.) the same spectral range. For example, filter 120A of camera 110A can have substantially the same spectral range as the filter of a camera not shown in FIG. 1 (e.g., both filters are green, both filters are red, both filters are blue, both filters are yellow, and/or the like). Two cameras having the same spectral response but being slightly (e.g., one to two millimeters) offset from each other (e.g., due to the natural side-by-side positioning of the cameras on the device) can be used to correct for parallax error because differences between the two substantially similar images are not due to spectral differences but due to the physical offset of the two cameras. In addition, the two images can be used to improve the signal-to-noise ratio (SNR) when generating image 190. For example, the two nearly identical images (e.g., after parallax has been corrected) can allow for the noise to be reduced by averaging two "noisy" images, where the average will have less noise (e.g., a noisy signal value at one pixel in one image will be reduced by the less-noisy signal values at that pixel in the other image—the noisy values and the less-noisy values get closer to the true value).

Although the cameras 110A, 110B, and 110C in FIG. 1 each included a single meta-optic lens 130A, 130B, and 130C, respectively, in other implementations, at least one of the cameras 110A, 110B, or 110C can include multiple meta-optic lenses. For example, a camera (e.g., camera 110A) can include a first meta-optic lens (e.g., meta-optic lens 130A) and second meta-optic lens (not shown in FIG. 1), where the second meta-optic lens can be located in front of or behind a filter (e.g., filter 120A) and/or in front of or behind the first meta-optic lens.

Although not shown in FIG. 1, each camera 110A, 110B, and 110C can include at least one aperture (e.g., to block stray light and/or substantially off-angle light), where that at least one aperture can be located in front of and/or behind the meta-optic lens for that camera to manage the collection angle, chief ray angle, and/or the like. For example, in some implementations, each camera 110A, 110B, and 110C can include two apertures, where one aperture is located in front of the meta-optic lens for that camera and the other aperture is located behind the meta-optic lens. In such implementations, the aperture located in front of the meta-optic lens(es) for a given camera can be smaller (i.e., a smaller opening) than the aperture located behind the meta-optic lens(es) for that camera. The apertures for the cameras 110A, 110B, 110C can have the same size, different sizes, or a combination thereof. In some implementations, the apertures for the cameras 110A, 110B, 110C can be located on a single common plane. In some implementations, the apertures for the cameras 110A, 110B, 110C can be slightly diagonal to one another (e.g., in a triangular formation for implementations where the sensors are in a triangular formation).

Although not shown in FIG. 1, each camera 110A, 110B, and 110C can include at least one refractive element (i.e., refractive lens) to correct and/or reduce aberrations, where that at least one refractive element can be located in front of and/or behind the meta-optic lens for that camera, and/or the filter for that camera. For example, incident light can travel through an aperture of a camera (e.g., camera 110A), pass through a refractive element thereafter, pass through a filter (e.g., filter 120A) thereafter, pass through a meta-optic lens (e.g., meta-optic lens 130A) thereafter, and be incident on a sensor (e.g., sensor 140A) thereafter to generate a representation of image 150A.

Although not shown in FIG. 1, in some implementations, an infrared (IR) filter can be used. In some implementations, at least one of the cameras 110A, 110B, or 110C can include an IR filter. The IR filter can be located in front of the sensor for that camera (e.g., directly on top of the sensor, directly on top of the meta-optic lens, directly on top of the color filter, etc.). In some implementations, a fourth camera (not shown in FIG. 1) can be included in camera system 100. The fourth camera can have a nearly identical structure to cameras 110A, 110B, 110C, but use an IR filter instead of a color filter. Otherwise, as was the case for camera 110A, 110B, 110C, light from the same scene can travel through the IR filter, travel through a meta-optic lens included in the fourth camera, and be incident on a sensor included in the fourth camera to generate a representation of an image. The representation of the image generated by the fourth camera can be used, in addition to the representation of images 150A, 150B, 150C, by the circuitry 160 to generate a representation of image 190.

Although FIG. 1 shows three sensors 140A, 140B, 140C, in some implementations, a single sensor (not shown in FIG. 1) can be used. Said similarly, in some implementations, the camera system 100 can include multiple meta-optic lenses and multiple filters, but only a single sensor. In other words, in some implementations, a single sensor can receive light associated with (e.g., travelling through) multiple different meta-optic lenses and filters. Light passing through each meta-optic lens from the multiple meta-optic lenses can be incident on different sections of the sensor (with or without some overlap between some sections). For example, light passing through meta-optic lens 130A can be incident on a left portion of the single sensor, light passing through meta-optic lens 130B can be incident on a center portion of the single sensor, and light passing through meta-optic lens 130C can be incident on a right portion of the single sensor; in some implementations, part of the center portion partially overlaps with the left portion, and a different part of the center portion partially overlaps with the right portion.

Although the filters 120A, 120B, and 120C shown in FIG. 1 are in front of (e.g., in contact with) the meta-optic lens 130A, 130B, and 130C, respectively, the location of the filters 120A, 120B, 120C can vary in other implementations. For example, a filter (e.g., filter 120A, or an IR filter) can be located in front of (e.g., directly on top of) a sensor (e.g., sensor 140A). As another example, where an aperture is located between a meta-optic lens (e.g., meta-optic lens 130A) and sensor (e.g., sensor 140A), a filter (e.g., filter 120A, or an IR filter) can be located (1) between the meta-optic lens and the aperture (e.g., directly on top of the aperture), or (2) between the aperture and the sensor (e.g., directly on top of the sensor).

Although not shown in FIG. 1, in some implementations, anti-reflective (AR) coating and/or infrared (IR) coating can be used in camera system 100. In some implementations, AR coating and/or IR coating can be disposed on and/or applied to a meta-optic lens (e.g., the entire lens, one side of the lens, etc.). In some implementations, AR coating and/or IR coating can be applied to and/or disposed on a filter (e.g., the entire filter, one side of the filter, etc.).

Note that a first object being located "in front of" a second object can refer to the first object being closer to incident light entering the camera 110A, 110B, 110C relative to the second object. A first object being located "behind" a second object can refer to the second object being closer to incident light entering the camera 110A, 110B, 110C relative to the first object. The first object and/or second object can be, for example, a meta-optic lens, color filter, IR filter, refractive element, filter, or sensor.

In an embodiment, a camera system comprises a first camera (e.g., camera 110A) including a first filter (e.g., filter 120A) having a spectral response (e.g., one of red, green or blue), a first meta-optic lens (e.g., meta-optic 130A), and a first sensor (e.g., sensor 140A). The camera system also comprises a second camera (e.g., camera 110B) including a second filter (e.g., filter 120B) having a spectral response (e.g., one of red, green, or blue) different than the spectral response of the first filter, a second meta-optic lens (e.g., meta-optic lens 130B), and a second sensor (e.g., sensor 140B). The camera system also comprises a processor (e.g., processor 170) configured to: receive a representation of a first image (e.g., image 150A) of a scene captured by the first camera, receive a representation of a second image (e.g., image 150B) of the scene captured by the second camera, and generate a representation of a superposed image (e.g., image 190) of the scene based on the representation of the first image and the representation of the second image, the representation of the superposed image having an aberration lesser than an aberration of the representation of the first image and the representation of the second image. In some implementations, the representation of the superposed image is transformed into a formed image and displayed via a display.

In some implementations, the camera system further comprises a third camera (e.g., camera 110C) including a third filter having a third spectral response (e.g., one of red, green or blue) different than the spectral response of the first filter and the spectral response of the second filter, a third meta-optic lens (e.g., meta-optic lens 130C), and a third sensor (e.g., sensor 140C); in such an implementation, the processor can be further configured to receive a representation of a third image (e.g., image 150C) of the scene captured by the third camera, where generating the representation of the superposed image of the scene can be further based on the representation of the third image.

In some implementations, the camera system further comprises a third camera (e.g., camera 110C) including a third filter having a third spectral response (e.g., one of red, green or blue) substantially similar to the spectral response of the first filter but not the spectral response of the second filter, a third meta-optic lens (e.g., meta-optic lens 130C), and a third sensor (e.g., sensor 140C); in such an implementation, the processor can be further configured to receive a representation of a third image (e.g., image 150C) of the scene captured by the third camera, where the representation of the first image and the representation of the third image are used for parallax correction and noise reduction during generating the representation of the superposed image.

In some implementations, the spectral response of the first filter includes red, the spectral response of the second filter includes green, and the spectral response of the third filter includes blue. In some implementations, the first camera, the second camera, and the third camera are disposed on a common plane (e.g., side-by-side), the second camera being disposed between the first camera and the second camera.

In some implementations, an anti-reflective coating is disposed on only the first meta-optic lens, only the second meta-optic lens, or both the first meta-optic lens and the second meta-optic lens. In some implementations, an infrared coating is disposed on only the first meta-optic lens, only the second meta-optic lens, or both the first meta-optic lens and the second meta-optic lens.

In some implementations, the camera system further includes at least one aperture stop located between (1) the first meta-optic lens and the first filter, and (2) the second meta-optic lens and the second filter. In some implementations, the camera system further includes at least one aperture stop located between (1) the first meta-optic lens and the first sensor, and (2) the second meta-optic lens and the second sensor.

In some implementations, the camera system further comprises a fourth camera (not shown in FIG. 1) including a fourth filter having a fourth spectral response (e.g., yellow color filter) different than the spectral response of the first filter, the spectral response of the second filter, and the spectral response of the third filter, a fourth meta-optic lens, and a fourth sensor; in such an implementation, the processor can be further configured to receive a representation of a fourth image of the scene captured by the fourth camera, where generating the representation of the superposed image of the scene can be further based on the representation of the fourth image.

In an embodiment, a camera system comprises a plurality (e.g., two, three, four, five, etc.) of cameras (e.g., at least two of camera 110A, 110B, or 110C) configured to generate a representation of a plurality of images (e.g., at least two of image 150A, 150B, or 150C) of a scene, each camera from the plurality of cameras including a filter (e.g., filter 120A, 120B, or 120C) with a spectral response different from a spectral response of a filter for each remaining camera, a meta-optic lens (e.g., meta-optic lens 130A, 130B, or 130C), and a sensor (e.g., sensor 140A, 140B, or 140C). The camera system further comprises a processor (e.g., processor 170) configured to receive the representation of the plurality of images of the scene, and generate a representation of a superposed image (e.g., image 190) of the scene based on the representation of the plurality of images.

In some implementations, generating the representation of the superposed image can include performing parallax correction, deconvolution, distortion correction, and/or upsampling to the representation of the plurality of images to generate a representation of a plurality of superposed images, and superposing the representation of the plurality of superposed images to form the representation of the superposed image.

In some implementations, the camera system includes only two cameras. In such a case, the plurality of images can include at least a first image and a second image (and in some implementations, no additional images). In some implementations, the camera system includes only three cameras. In such a case, the plurality of images can include at least a first image, a second image, and a third image (and in some implementations, no additional images). In some implementations, the camera system includes only four cameras. In such a case, the plurality of images can include at least a first image, a second image, a third image, and a fourth image (and in some implementations, no additional images).

In some implementations, camera system 100 includes a baffle. For example, the baffle can be located above meta-optic lenses 130A, 130B, 130C such that light passes through the baffle before passing through meta-optic lenses 130A, 130B, 130C. In some implementations, the baffle is wider at the end further from the meta-optic lens, and gets narrower closer to the meta-optic lens to eliminate high angle rays. In some implementations, the baffle is attached to an aperture stop or also acts as an aperture stop. In some implementations, the baffle protrudes vertically along the length of the camera system 100. The baffle can eliminate and/or reduce cross talk by allowing light to be received by a given camera 110A, 110B, 110C while blocking that light from going into other cameras 110A, 110B, 110C (that light can be considered high-angle light from the perspective of the other cameras 110A, 110B, 110C).

Figure 2:
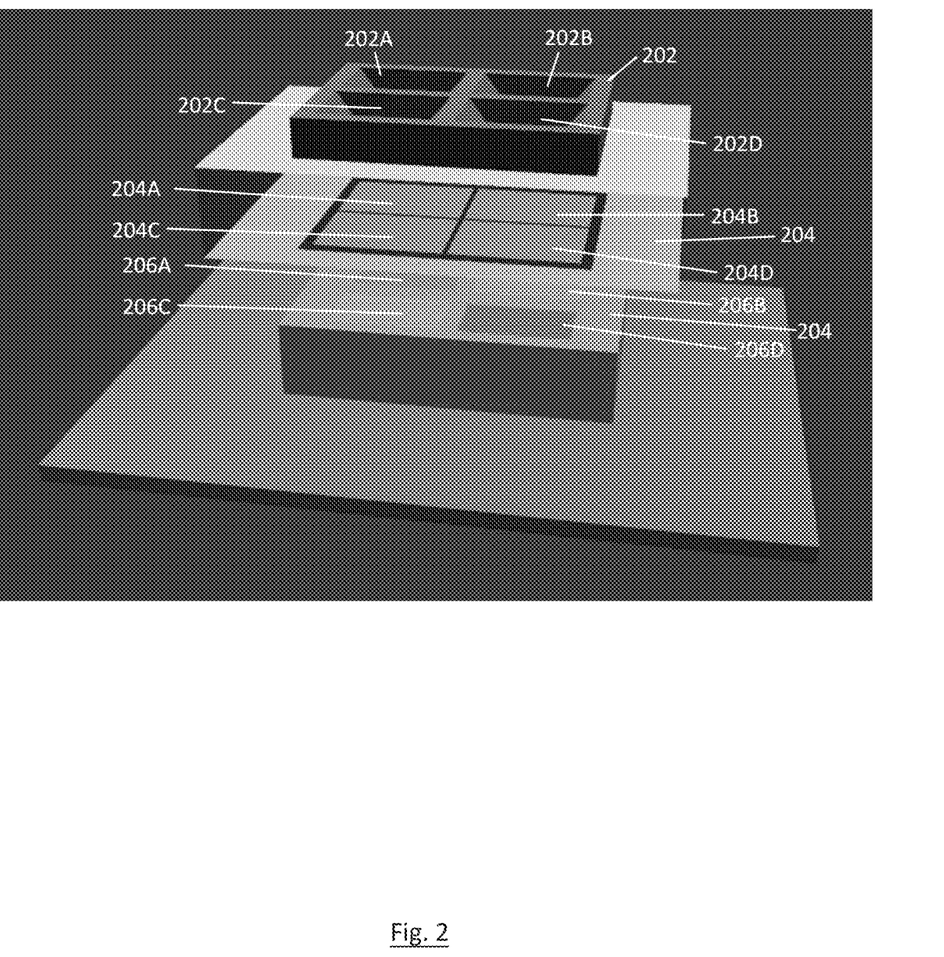
FIG. 2 shows a camera system with a baffle and multiple meta-optic lenses, according to an embodiment.

FIG. 2 shows a camera system with a baffle and multiple meta-optic lenses, according to an embodiment. Filters 206 includes four filters—red filter 206A, green filter 206B, green filter 206C, and blue filter 206D. Meta-optic lenses 204 includes four meta-optic lenes—meta optic lens 204A, meta-optic lens 204B, meta-optic lens 204C, and meta-optic lens 204D. Baffle 202 includes four openings—opening 202A, opening 202B, opening 202C, and opening 202D. Light can pass through opening 202A, through meta-optic lens 204A, and through filter 206A to an image sensor. Light can also pass through opening 202B, through meta-optic lens 204B, and through filter 206B to an image sensor. Light can also pass through opening 202C, through meta-optic lens 204C, and through filter 206C to an image sensor. Light can also pass through opening 202D, through meta-optic lens 204D, and through filter 206D to an image sensor.

Although FIG. 2 shows the camera system with baffle 202 and without a separate aperture stop, the baffle 202 can be configured to act as an aperture stop. For example, the outer perimeter of each upper portion of the openings 202A, 202B, 202C, 202D can act as an aperture stop depending on the size of that outer perimeter relative to other dimensions of the camera system. Alternatively, the outer perimeter of each lower portion of the openings 202A, 202B, 202C, 202D can act as an aperture stop depending on the size of that outer perimeter relative to other dimensions of the camera system. Additionally or alternatively, a separate aperture stop can be included.

Figure 3:
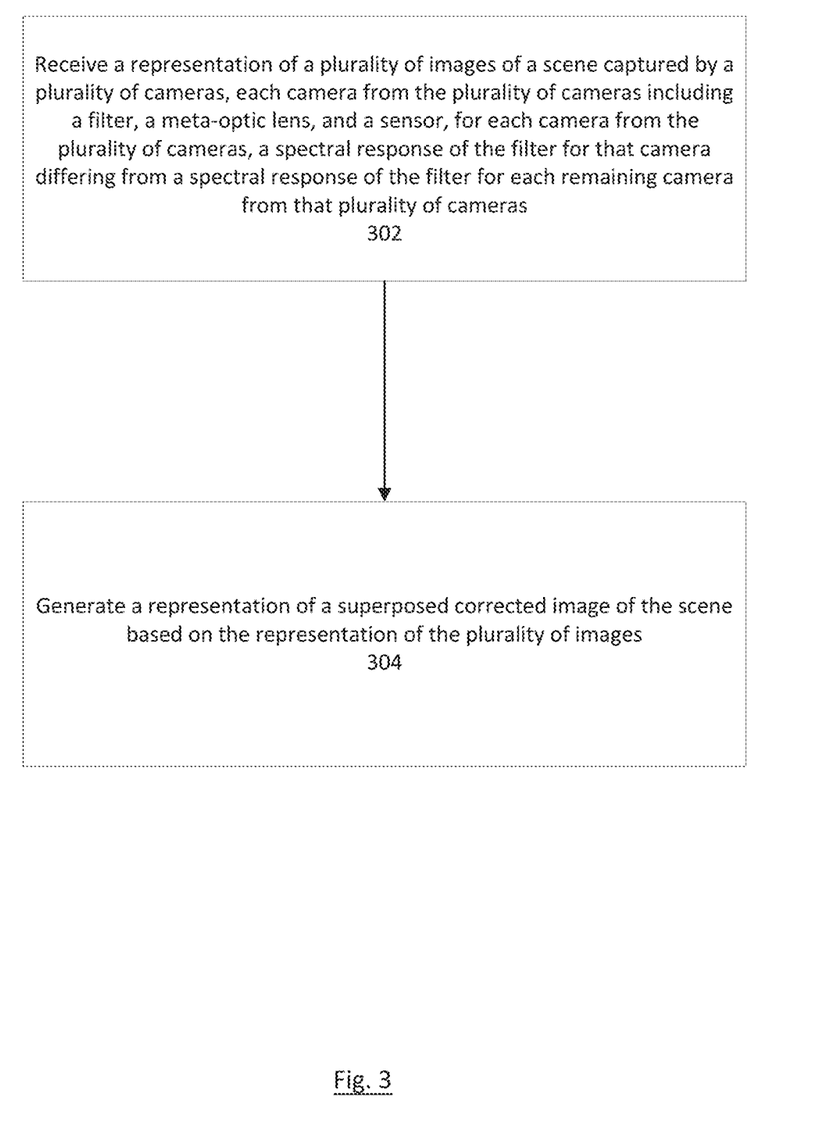
FIG. 3 shows a flowchart of a method for generating an image based on a representation(s) of multiple images each captured using a meta-optic lens, according to an embodiment.

FIG. 3 shows a flowchart of a method for generating a representation of an image based on a representation of a plurality of images each captured using a meta-optic lens and unique color filter, according to an embodiment. In some implementations, the method discussed with respect to FIG. 3 can be performed by/at the processor 170.

At 302, receive a representation of a plurality (e.g., two, three, four, five) of images (e.g., image 150A, 150B, 150C) of a scene captured by a plurality of cameras (e.g., camera 110A, 110B, 110C), each camera from the plurality of cameras including a filter (e.g., filter 120A, 120B, or 120C), a meta-optic lens (e.g., meta-optic lens 130A, 130B, or 130C), and a sensor (e.g., sensor 140A, 140B, or 140C). For each camera from the plurality of camera, a spectral response of the filter for the camera differs from a spectral response of the filter for each remaining camera from the plurality of camera. At 304, generate a representation of a superposed corrected image (e.g., image 190) of the scene based on the representation of the plurality of images. In some implementations, the representation of the plurality of images are transformed into a representation of plurality of superposed images (e.g., via parallax correction, deconvolution, distortion correction, and/or up-sampling software), and the representation of the plurality of superposed images are superposed to generate the representation of the superposed corrected image at 304. In some implementations, the representation of the superposed corrected image is transformed into a formed image and displayed (e.g., automatically and without requiring further human input) at a display in response to generating the representation of the superposed corrected image at 304.

In some implementations, the plurality of cameras includes only two cameras. In some implementations, the plurality of cameras includes only three cameras. In some implementations, the plurality of cameras includes only four cameras. In some implementations, the plurality of cameras includes more than four cameras.

In some implementations, where the plurality of cameras includes four cameras, the spectral response of the filter for a first camera includes red, the spectral response of the filter for a second camera includes green, the spectral response of the filter for a third camera includes blue, and the spectral response of the filter for a fourth camera includes a color different than red, green, and blue (e.g., yellow, cyan, magenta, etc.).

In some implementations, where the plurality of cameras includes four cameras, the spectral response of the filter for a first camera includes red, the spectral response of the filter for a second camera includes green, the spectral response of the filter for a third camera includes blue, and the filter for a fourth camera is an infrared filter.

In some implementations, the plurality of cameras includes any number of cameras (e.g., at least 5 cameras, at least 10 cameras, at least 20 camera, etc.). In some implementations, each camera from the plurality of cameras can be associated with a different spectral response. In some implementations, two or more cameras from the plurality of cameras can have the same spectral response. In some implementations, two or more cameras from the plurality of cameras have the same spectral response, and the remaining cameras from the plurality of cameras are associated with spectral response different than all other cameras from the remaining cameras; for example, a first camera is associated with a spectral response that includes green, a second camera is associated with a spectral response that includes green, a third camera is associated with a spectral response that includes red, a fourth camera is associated with a spectral response that includes blue, and a fifth camera is associated with a spectral response that includes yellow.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A system, comprising:
   a first camera including a first filter having a spectral response, a first meta-optic lens, and a first sensor;
   a second camera including a second filter having a spectral response different than the spectral response of the first filter, a second meta-optic lens, and a second sensor; and
   a processor configured to:
      receive a representation of a first image of a scene captured by the first camera,
      receive a representation of a second image of the scene captured by the second camera,
      perform deconvolution based on the representation of the first image to generate a representation of a first deconvolved image,
      perform deconvolution based on the representation of the second image to generate a representation of a second deconvolved image,
      perform parallax correction based on the representation of the first deconvolved image to generate a representation of a first parallax corrected image,
      perform parallax correction based on the representation of the second deconvolved image to generate a representation of a second parallax corrected image, and
      perform demosaicing based on the representation of the first parallax corrected image and the representation of the second parallax corrected image to generate a final image having an aberration less than an aberration of the representation of the first image and an aberration of the representation of the second image.

2. The system of claim 1, further comprising:
   a third camera including a third filter having a third spectral response different than the spectral response of the first filter and the spectral response of the second filter, a third meta-optic lens, and a third sensor, the processor further configured to receive a representation of a third image of the scene captured by the third camera, and generate the representation of the final image of the scene further based on the representation of the third image.

3. The system of claim 2, further comprising:
   a fourth camera including (1) a fourth filter having a fourth spectral response different than the spectral response of the first filter, the spectral response of the second filter, and the spectral response of the third filter, (2) a fourth meta-optic lens, and (3) a fourth sensor, the processor further configured to receive a representation of a fourth image of the scene captured by the fourth camera, and generate the representation of the final image of the scene further based on the representation of the fourth image.

4. The system of claim 2, wherein the spectral response of the first filter includes red, the spectral response of the second filter includes green, and the spectral response of the third filter includes blue.

5. The system of claim 2, wherein the first camera, the second camera, and the third camera are disposed on a common plane, the second camera being disposed between the first camera and the third camera.

6. The system of claim 1, further comprising:
a third camera including (1) a third filter having a third spectral response substantially similar to the spectral response of the first filter but not the spectral response of the second filter, (2) a third meta-optic lens, and (3) a third sensor, the processor further configured to receive a representation of a third image of the scene captured by the third camera, and generate the representation of the final image of the scene further based on the representation of the third image, the representation of the first image and the representation of the third image used for noise reduction during generating the representation of the final image.

7. The system of claim 1, wherein an anti-reflective coating is disposed on at least one of the first meta-optic lens or the second meta-optic lens.

8. The system of claim 1, wherein an infrared coating is disposed on at least one of the first meta-optic lens or the second meta-optic lens.

9. The system of claim 1, further comprising:
at least one aperture stop located between (1) the first meta-optic lens and the first sensor, and (2) the second meta-optic lens and the second sensor.

10. The system of claim 1, further comprising:
at least one aperture stop located between (1) the first meta-optic lens and the first filter, and (2) the second meta-optic lens and the second filter.

11. A system, comprising:
a plurality of cameras configured to generate a representation of a plurality of images of a scene, each camera from the plurality of cameras including a filter with a spectral response different from a spectral response of a filter for each remaining camera, a meta-optic lens, and a sensor; and
a processor configured to:
receive the representation of the plurality of images of the scene, and
perform parallax correction, deconvolution, and demosaicing using the representation of the plurality of images to generate a final image of the scene, the deconvolution performed prior to the parallax correction and the parallax correction performed prior to the demosaicing.

12. The system of claim 11, wherein the parallax correction is performed with respect to a single camera from the plurality of cameras.

13. The system of claim 11, wherein the parallax correction is performed with respect to the plurality of cameras.

14. The system of claim 11, wherein:
the plurality of cameras includes only a first camera and a second camera, and
the representation of the plurality of images includes only a first image and a second image.

15. The system of claim 11, wherein: the plurality of cameras includes only a first camera, a second camera and a third camera, and the representation of the plurality of images includes a first image, a second image, and a third image.

16. The system of claim 11, wherein the plurality of cameras includes only a first camera, a second camera, a third camera, and a fourth camera, and the representation of the plurality of images includes a first image, a second image, a third image, and a fourth image.

17. A method, comprising:
receiving a representation of a plurality of images of a scene captured by a plurality of cameras, each camera from the plurality of cameras including a filter, a meta-optic lens, and a sensor,
for each camera from the plurality of cameras, a spectral response of the filter for that camera differing from a spectral response of the filter for each remaining camera from the plurality of cameras;
deconvolving the representation of the plurality of images to generate a representation of a plurality of deconvolved images;
parallax correcting the representation of the plurality of deconvolved images to generate a representation of a plurality of parallax corrected images; and
demosaicing the plurality of parallax corrected images to generate a representation of a final image of the scene.

18. The method of claim 17, wherein the plurality of cameras includes a first camera, a second camera, a third camera, and a fourth camera.

19. The method of claim 18, wherein the spectral response of the filter for the first camera includes red, the spectral response of the filter for the second camera includes green, the spectral response of the filter for the third camera includes blue, and the spectral response of the filter for the fourth camera includes yellow.

20. The method of claim 18, wherein the spectral response of the filter for the first camera includes red, the spectral response of the filter for the second camera includes green, the spectral response of the filter for the third camera includes blue, and the filter for the fourth camera is an infrared filter.

* * * * *